United States Patent [19]
Vincent

[11] Patent Number: 5,409,366
[45] Date of Patent: Apr. 25, 1995

[54] APPARATUS FOR PROCESSING EXTRUDABLE MATERIALS

[75] Inventor: Maurice W. Vincent, Newbury, England

[73] Assignee: Stork Protecon B.V., Netherlands

[21] Appl. No.: 904,368

[22] Filed: Jun. 25, 1992

[30] Foreign Application Priority Data

Jun. 26, 1991 [GB] United Kingdom ............... 9113789

[51] Int. Cl.$^6$ ............ B01F 7/00; B29B 7/48;
B29C 47/40; B29C 47/64
[52] U.S. Cl. ............... 425/204; 264/211.23;
366/76; 366/80; 366/85; 366/86; 425/145;
425/208
[58] Field of Search ............... 425/145, 204, 206, 207,
425/208; 366/83, 85, 84, 86, 301, 76, 80;
264/211.23

[56] References Cited

U.S. PATENT DOCUMENTS

| | | | |
|---|---|---|---|
| 1,290,505 | 1/1919 | Bulley | 366/83 |
| 2,942,294 | 6/1960 | Reifenhauser | 425/204 |
| 3,224,739 | 12/1965 | Schuur | 425/204 |
| 3,577,588 | 5/1971 | Chisholm | 425/131.1 |
| 3,667,733 | 6/1972 | Fritsch | 366/85 |
| 3,746,319 | 7/1973 | Blach | 366/85 |
| 3,865,354 | 2/1975 | Burpulis et al. | 366/76 |
| 3,871,629 | 3/1975 | Hishida | 366/76 |
| 3,883,122 | 5/1975 | Werner | 366/85 |
| 4,212,543 | 7/1980 | Bersano | 425/204 |
| 4,214,862 | 7/1980 | Kolossow | 425/204 |
| 4,447,156 | 5/1984 | Csongor | 366/80 |
| 4,514,090 | 4/1985 | Neubauer et al. | 366/301 |

FOREIGN PATENT DOCUMENTS

| | | |
|---|---|---|
| 2325278 | 1/1974 | France . |
| 843849 | 8/1960 | United Kingdom . |
| 2034628 | 6/1980 | United Kingdom . |
| 2051656 | 1/1981 | United Kingdom . |

Primary Examiner—Jay H. Woo
Assistant Examiner—Joseph Leyson
Attorney, Agent, or Firm—Andrus, Sceales, Starke & Sawall

[57] ABSTRACT

An apparatus is disclosed for processing extrudable materials in such a way as to apply a controlled and predetermined degree of shear force to the materials. Typically, an extruder apparatus includes a housing having first and second screws mounted therein for rotation on a common axis, the arrangement being such that longitudinal thrust forces exerted by the first screw are at least partially compensated by corresponding forces generated by the second screw, inlet means for introducing material to be processed into the housing and a shear generating device located between said screws, said device including a restriction through which material is forced from said housing to exit from said housing. The restriction is preferably an annular gap formed by a sleeve fixed relatively to the housing and a shaft portion which extends into the sleeve.

6 Claims, 6 Drawing Sheets

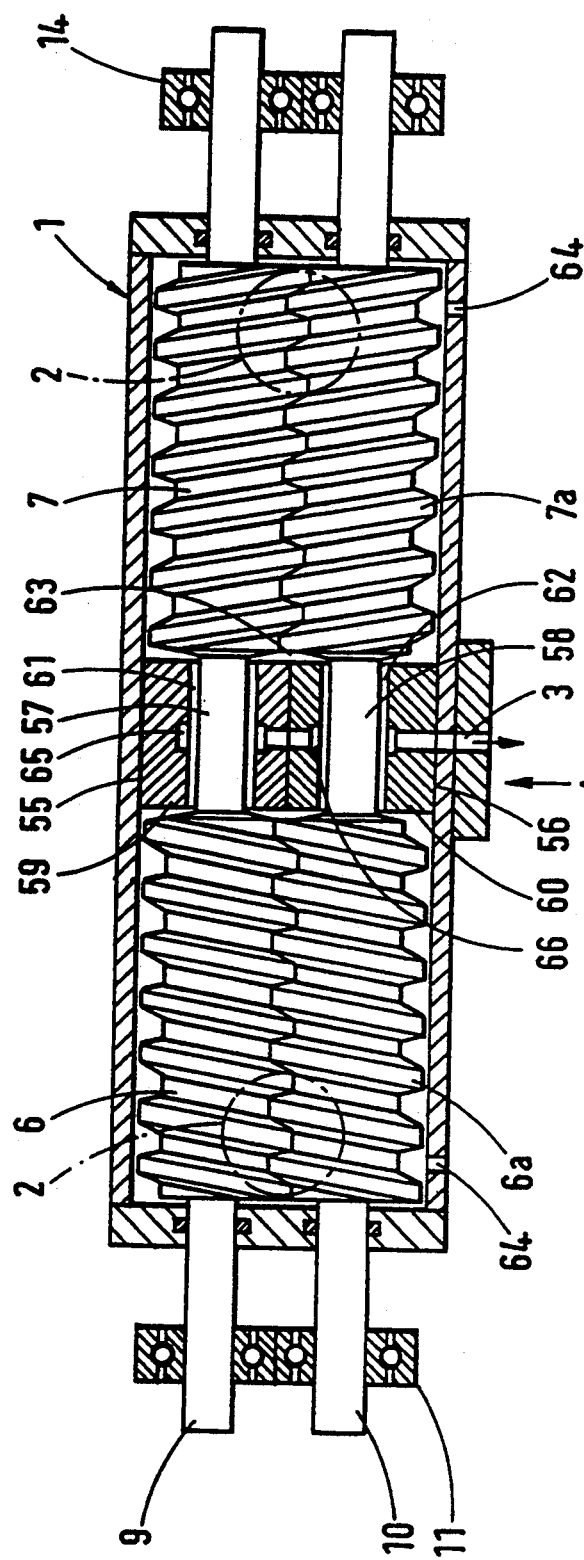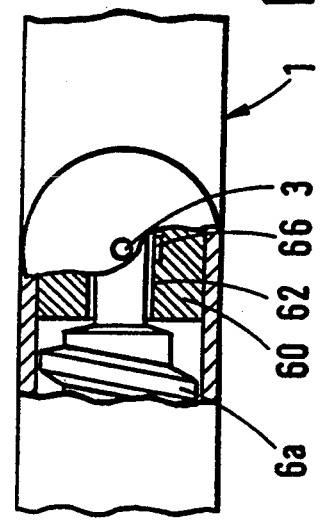

APPARATUS FOR PROCESSING EXTRUDABLE MATERIALS

BACKGROUND OF THE INVENTION

This invention relates to the processing of extrudable materials and in particular provides a screw processor having means for controlling the generation of shear within the apparatus.

Screw processors typically comprise one or more screw threads mounted for rotation within a housing. Material to be processed is fed into the housing and is conveyed to an outlet by rotation of the screw or screws. At the outlet, the processed material is normally discharged through a die. Material contained in the processor is subjected to shear forces generated by reaction between the screw thread and the housing and also between interacting screw thread portions, where twin screws are employed. The action of the screw thread on the material is also to increase its pressure so that at the outlet, pressures of the order of 7 to 360 bar are not exceptional. The material may also be heated during passage through the screw processor and this may be due to the use of external heaters, arranged to heat the housing as the material passes from the inlet to the outlet, but may also be heated by frictionally-generated heat.

Conventional screw processors are driven by a gear box at one end, arranged to drive a shaft which is supported in a bearing, located at the inlet end of the housing. Because of the difficulties of providing passage for the extruded material to pass around a bearing at the outlet end, the shaft or shafts bearing the screws are normally supported in cantilever fashion within the housing. As a result, the shaft is subjected to radial forces which cause the shaft to bend so that the shaft engages the housing or barrel during the mixing of extrusion process. This causes abrasive metal-to-metal contact and also generates high rates of wear between the screw flights and the inner surfaces of the barrel. As a result of the contact between the shaft and the barrel, shear forces are generated in an unpredictable and variable manner within the housing. When processing certain materials, particularly starchy products, undesirable changes or damage can occur under conditions of uncontrolled shear forces. For example, in the processing of cereal starches into, for example, breakfast cereals, snacks and crispbread, or the conversion of vegetable protein into meat-like products, undesirable changes and degradations of the raw materials can be caused by undesirably high and localized shear forces.

Typically, starch cells may be at least partially ruptured and the polysaccharides in the starches may be degraded into shorter oligosaccharides such as maltose. As a consequence, color and flavor can be adversely affected. If the degree of shear applied to the materials as they are processed could be controlled, undesired degradation could be avoided or a desired degree of transformation in the product could be achieved. Whereas it is theoretically possible to control the amount of shear by changing the rotational speed or geometry of the screws, in practice, this is very difficult to achieve because of the distortion of the screws which occurs in a conventional screw processor. The present invention seeks to control the amount of shear applied to a material to be processed, particularly a food material, in order that the desired degree of transformation of the product can be secured during the extrusion process. In the case of, for example, starchy materials, the amount of starch cell rupture can be varied as desired from essentially nil to treatments where starch cells are swollen but not ruptured, through to treatments where at least some cells are ruptured and ultimately to the complete destruction of the starch structure.

SUMMARY OF THE INVENTION

According to one aspect of the present invention there is provided apparatus for processing extrudable materials which comprises a housing having at least one screw mounted on a shaft for rotation therein to produce a substantially uniform mix as the material is transported from an inlet to an outlet, characterized by a shear force generating device associated with the screw or shaft and located in the region of the outlet, said device including a gap through which material is forced by said screw to exit from the housing, whereby shearing force applied to the material during passage through the apparatus is concentrated in said shear generating device.

In general, the length and profile of the screw or screws is selected so that a major part of the shearing force, which takes place in the extruder, is generated in the shear generating device. In the shear generating device, variables affecting the degree of shear developed include the cross-section, length and shape of the gap in the device, The effective length of the gap can be extended by providing a labyrinthine passage through the gap in the shear generating device.

In a preferred embodiment, the shear generating device comprises a sleeve which is fixed relative to the housing and wholly or partially surrounds the shaft supporting the screw or screws. An alternative arrangement has an enlarged shaft portion which has a diameter only slightly smaller than the internal diameter of the barrel, so as to form an annular gap through which material is compressed by the screws to reach the outlet from the barrel. Other arrangements are possible to provide the shear-generating cell, including one or more orifices or passages in a plate or elongated member.

In general, the shaft on which the screw is mounted is supported in the regions of opposed ends of the shaft (e.g. in bearings). The shear generating device will be located between the points of support for the shaft.

Preferably, the screw processing apparatus has balanced screws operating in the same housing, the arrangement being such that forces exerted by a first screw on material to be processed is at least partially compensated by forces exerted by the second screw.

The invention further includes apparatus for processing extrudable materials which comprises a housing having first and second screws mounted therein for rotation on a common axis, the arrangement being such that longitudinal thrust forces exerted by the first screw are at least partially compensated by corresponding forces generated by the second screw, inlet means for introducing material to be processed into the housing and a shear generating device located between said screws, said device including a restriction through which material is forced from said housing to exit from said housing.

BRIEF DESCRIPTION OF THE DRAWINGS

Embodiments of the invention will now be illustrated with reference to the accompanying drawings, in which:

FIG. 4 is a view similar to that of FIG. 3, but showing the shear devices in place, partly in section, FIG. 4a is a view taken in the direction of arrow A in FIG. 4.

DETAILED DESCRIPTION OF THE PREFERRED EMBODIMENTS

Figure 1:
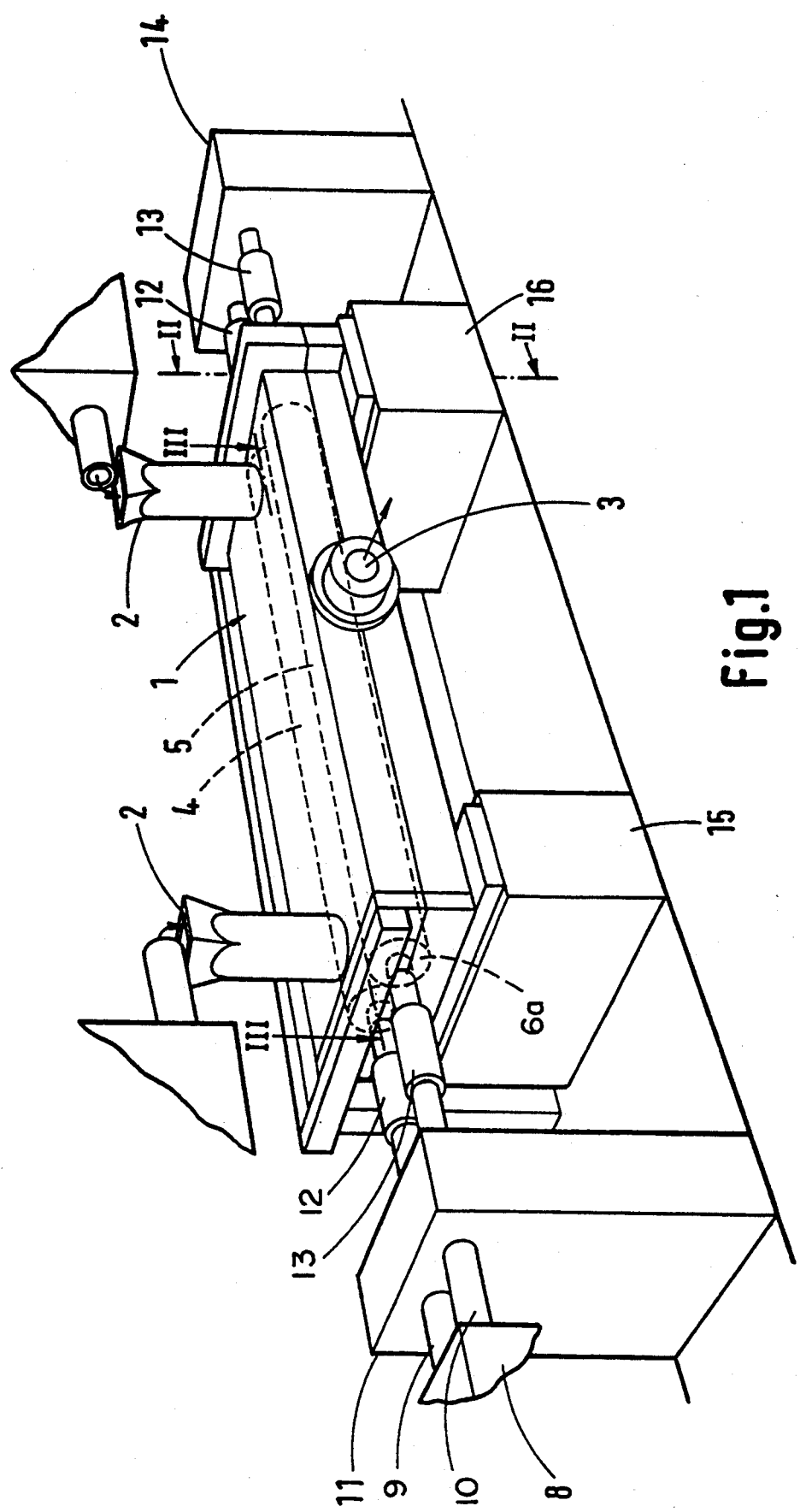
FIG. 1 is a perspective view of one extruder in accordance with the invention.
Figure 2:
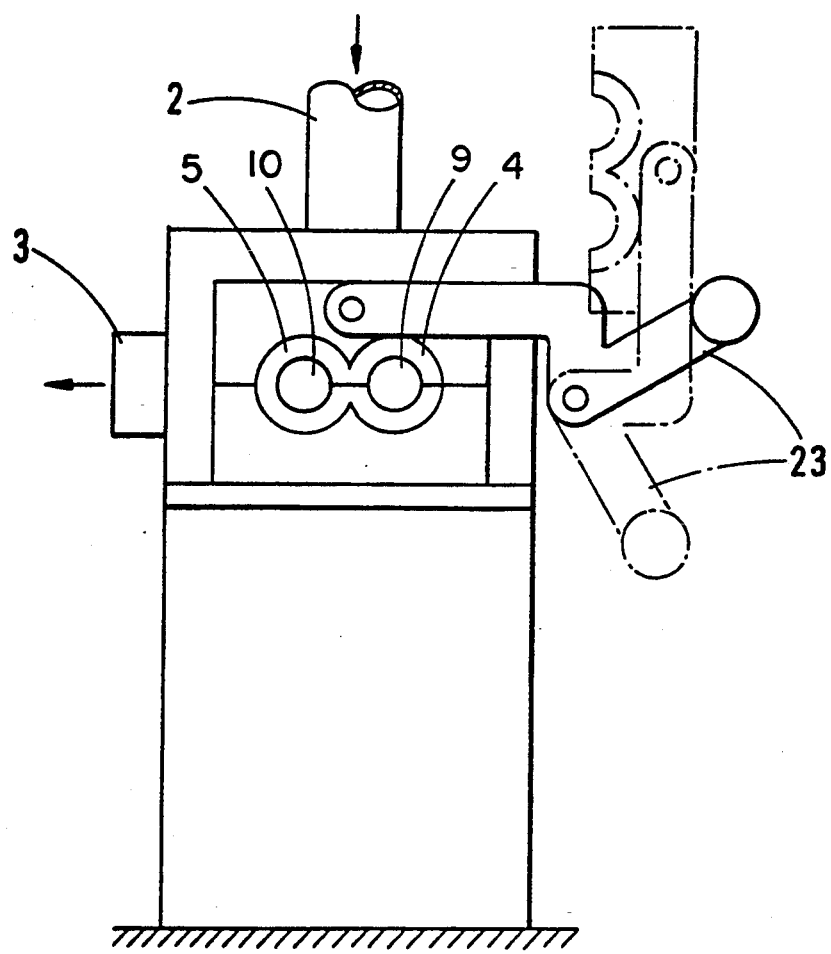
FIG. 2 is a view taken in the direction of the arrow II in FIG. 2.
Figure 3:
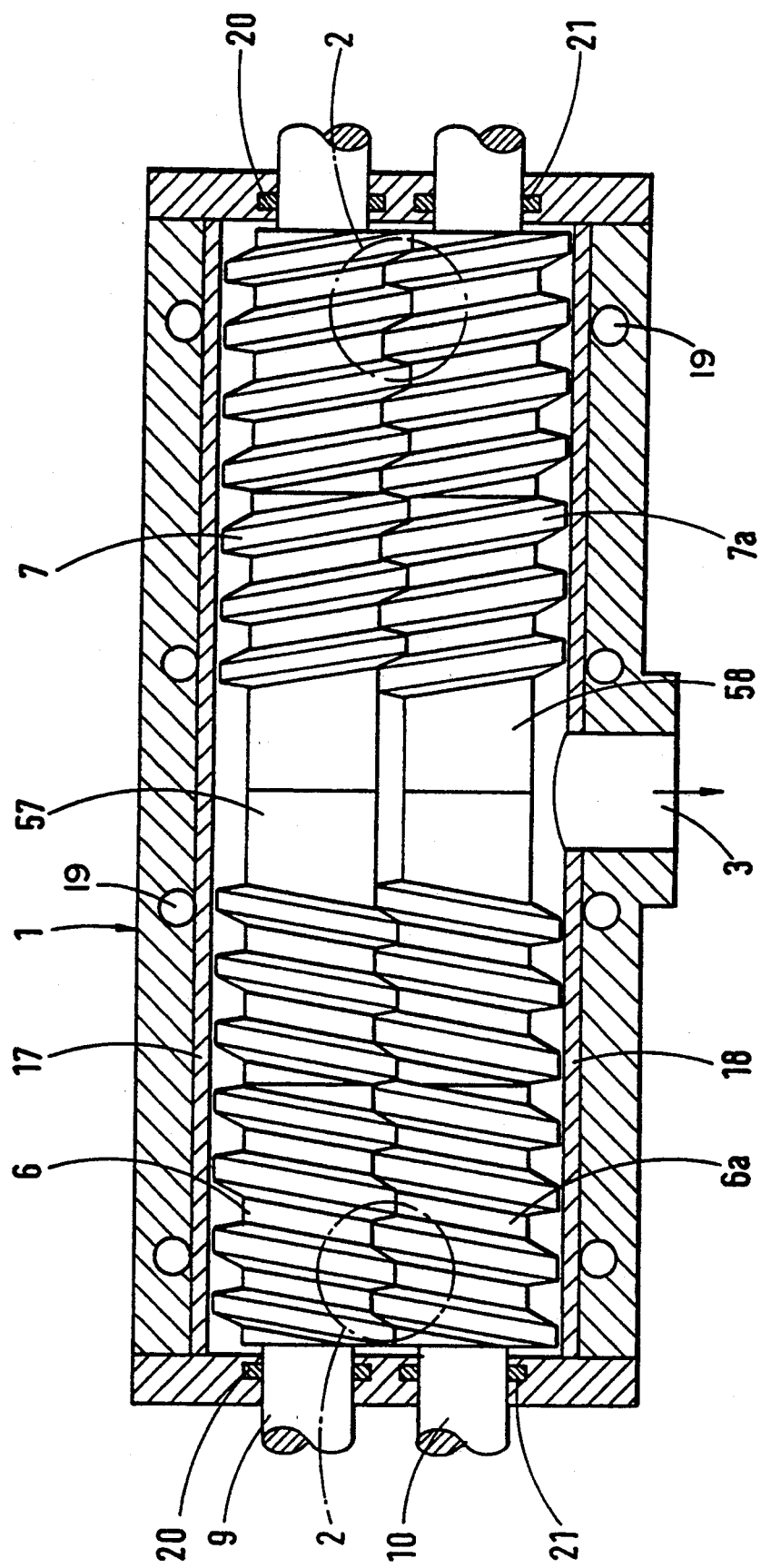
FIG. 3 is a plan view in the direction III—III in FIG. 1 of the screws with the top part of the housing removed but without the shear generating devices in place.

Referring to FIGS. 1, 2 and 3 of the drawings, it will be seen that the apparatus comprises a housing (1), having inlet ports connected to feed hoppers (2) for feeding material to be processed in the apparatus, During processing, the material is gradually compressed towards the center of the housing and is ejected through outlet (3). The pressure achieved at the diehead is typically in the range of 7 to 360 bar. A diehead, having an orifice of profile appropriate for the shape to be extruded, is fitted over the outlet 3.

Located within the housing (1) and nesting within barrels (4,5) shown in ghosted lines are a pair of screws (6,7), which are shown best in FIG. 3. Screws (6,7) are mounted on shafts (9,10) and are driven via a gear box (8). Shafts (9,10) are supported in bearing assembly (11) and connected to the screws by coupling sleeves (12,13). At the end remote from gear box (8), shafts (9,10) are supported in bearing block (14) and the entire housing assembly is mounted on supporting blocks (15,16), The gear box may be driven by any conventional method, e.g. electric motor, air or hydraulic motor or internal combustion engine. Cooling devices (not shown), e.g. provided by a water-cooling jacket incorporated in the housing may be used to control the temperature at which the processing takes place. Alternatively, similar means may be provided for raising the temperature at which processing is carried out by circulating a heated fluid through such a jacket or by electric heating elements (19) in conductive contact with the housing.

Referring to FIG. 3, this shows the heart of the processing device. Each of shafts (9,10) include splined sections, extending between the ends of the housing, which carry two screws (6,7 & 6a,7a). Alternatively, the screws may be held on the shafts by keys. Screws (6,6a) have threads or flights directed in an opposite sense to screws (7,7a). The screws may be constructed in sections and mounted by internal inter-engaging splines or by means of keys onto shafts (9,10). The screws may be built up from a number of separate sections so that the pitch and fineness of the threads can be varied more easily along the length of each shaft. However, the most preferred arrangement is for the pitch of the screws to become progressively finer from the outer ends towards the central point of the shaft and for the threads to be integral with the shaft.

In the embodiment illustrated in FIG. 3, the pitch, fineness and number of turns of each screw thread is symmetrical about a center line passing through the outlet port (3), so that one screw is the mirror image of the other screw on the same shaft. Thus, if the material to be processed is fed at equal rates and of similar consistency to each end of the housing (1) via hoppers (2), the force generated by the screws (6,6a) will be exactly counter-balanced by the forces generated by screws (7,7a). Thus, the forces exerted on the bearings (11,14) at each end of the housing will be identical and cancel each other out.

In the arrangement illustrated in FIG. 3, the screws are co-rotating and this has the result that the screws are self-wiping. Contra-rotating screws may, however, be desirable for some materials.

A clearance should exist between the periphery of the screws and the internal diameter of the barrel. In practice, a clearance of from about 0.3 to 1 mm is suitable. Smaller gaps are preferred for low viscosity material and vice versa. Although the clearance may be greater than this, it should generally not exceed about 2 mm. In the case where there are two inter-meshing screws, the clearance between the inter- meshing threads should be of a similar order. Shafts (9,10) are fitted with seals (20,21) to prevent egress of process material from the space between the rotating shafts and the housing ends.

In order to clean and service the apparatus, it is desirable to be able to gain ready access to the screws (6,7 etc.). This can be achieved by forming the housing in two parts and separating the two halves by pivoting one on the other or by raising and lowering the upper half. The former arrangement is illustrated in FIG. 2, in which the upper half of housing (1) can be pivoted into an open position by operating lever arm (23) as indicated in broken lines. Alternatively, the upper half of housing (1) may be mounted on vertical guides raised by fluid-operated rams or screw jacks. Although the barrel of the housing is shown as being lined in FIG. 3, this is not essential in the apparatus of this invention since mechanical wear is not a problem when using balanced screws.

One method of controlling the shear generated by the extruder shown in FIGS. 1 to 3 is shown in FIGS. 4 and 4a. In FIGS. 4 and 4a, the same reference numerals refer to similar components as in FIGS. 1 to 3. Located between the pairs of screws are two shear cells (55 & 56) (see FIG. 4). These shear cells comprise sleeves (59,60) surrounding shaft portions (57 & 58) on which the screws are mounted. The sleeves are held against rotation with respect to the housing by studs passing through the housing and into the sleeves. Shaft portions (57 & 58) are able to rotate within the sleeves and thus form annular shear gaps (61 & 62), through which material compressed by the screws must pass to reach the outlet (3). The annular gap (62) is connected to the outlet (3) by a transfer passage. The shear gap (61 or 62)

may vary depending upon the degree of shearing force desired but is typically within the range of 0.5 to 8 mm, preferably 1 to 4 mm. In the case of a low viscosity material, e.g. a sugar syrup, a gap of about 0.5 mm may be appropriate, while a heavy dough may require a gap of over 4 mm. By changing the length and width and profile of the annular gap or passage, the degree of shear force developed can be varied. Each of the sleeves (59,60) is formed as a pair of half-cylindrical shells which are joined together with dowels to form the sleeve. The sleeves are also machined with cooperating flats at (63).

As indicated at (64), additional inlets may be provided for example, for injection of liquids or modifying ingredients into the main mix which is processed in the extruder.

Sleeves (59,60) are formed with a circumferential external transfer groove (65,66), which connects at the flattened portion (63) between the two sleeves so that material extruded in both longitudinal directions through the gaps (61, 62) is collected and fed to the outlet (3) in a die plate, In the embodiment of FIGS. 4 and 4a, material pressed by each screw through the shear cell gap passes along only one half of the length of the gap (61 or 62) before it reaches the transfer passage (65,66) and exits from the extruder. Shear cells having a total sleeve (59,60) length of about 130 mm on a shaft portion (57,58) diameter of about 55 mm have been used successfully. In larger or smaller extruders, we prefer to keep the above dimensions generally in proportion.

Figure 5:
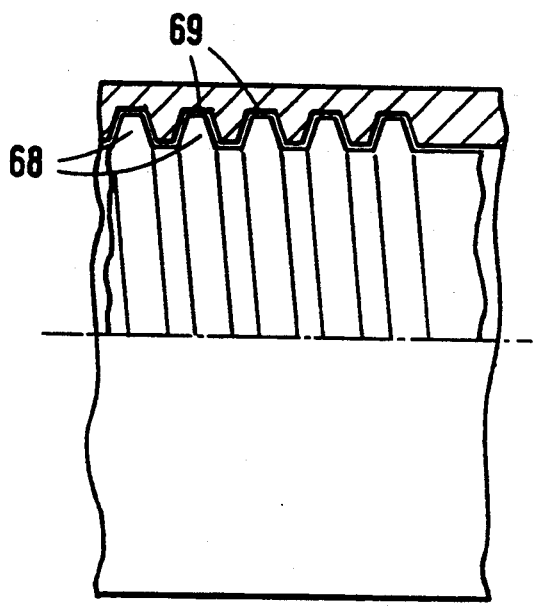
FIG. 5 is a longitudinal cross-section through a shear cell sleeve and shaft portion having a labyrinthine shear gap.
Figure 5A:
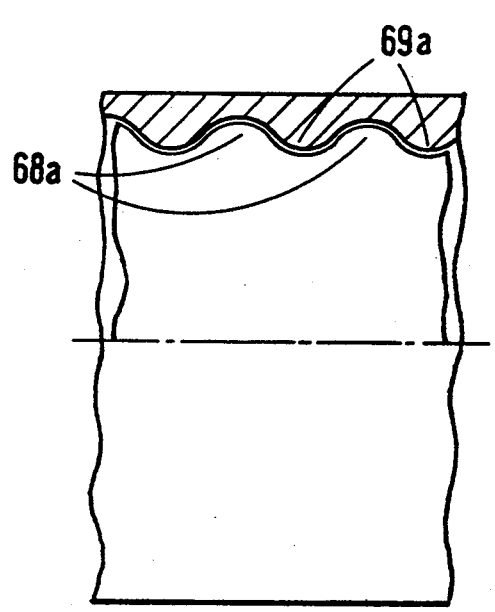
FIG. 5a is a similar cross-section through a shear cell sleeve and shaft portion having a labyrinthine shear gap having a wave-like tortuous path.

Referring to FIGS. 5 and 5a, these show alternative ways of shaping the cooperating surfaces of the shaft portions (57,58) and the inner surfaces of the shells forming the sleeves (59,60), to provide a tortuous path through the gaps. In FIG. 5, the shaft portion is formed with circumferential fins (68) and a sleeve (which is manufactured in two shell halves) is formed with circumferential grooves (69) which cooperate with the fins (68). It will be appreciated that the fins and grooves together provide a shear cell having a labyrinthine path for the compressed material to pass from the housing (1) to the outlet (3). This tortuous path extends the effective length of the gap (e.g. by 4 to 5 times) and enables a greater shearing force to be developed in a relatively short portion of the extruder. A modified arrangement is shown in FIG. 5a. In this embodiment, the shaft is formed with a wave-like profile (68a), while the inner surface of the sleeve has a corresponding profile (69a).

Figure 6:
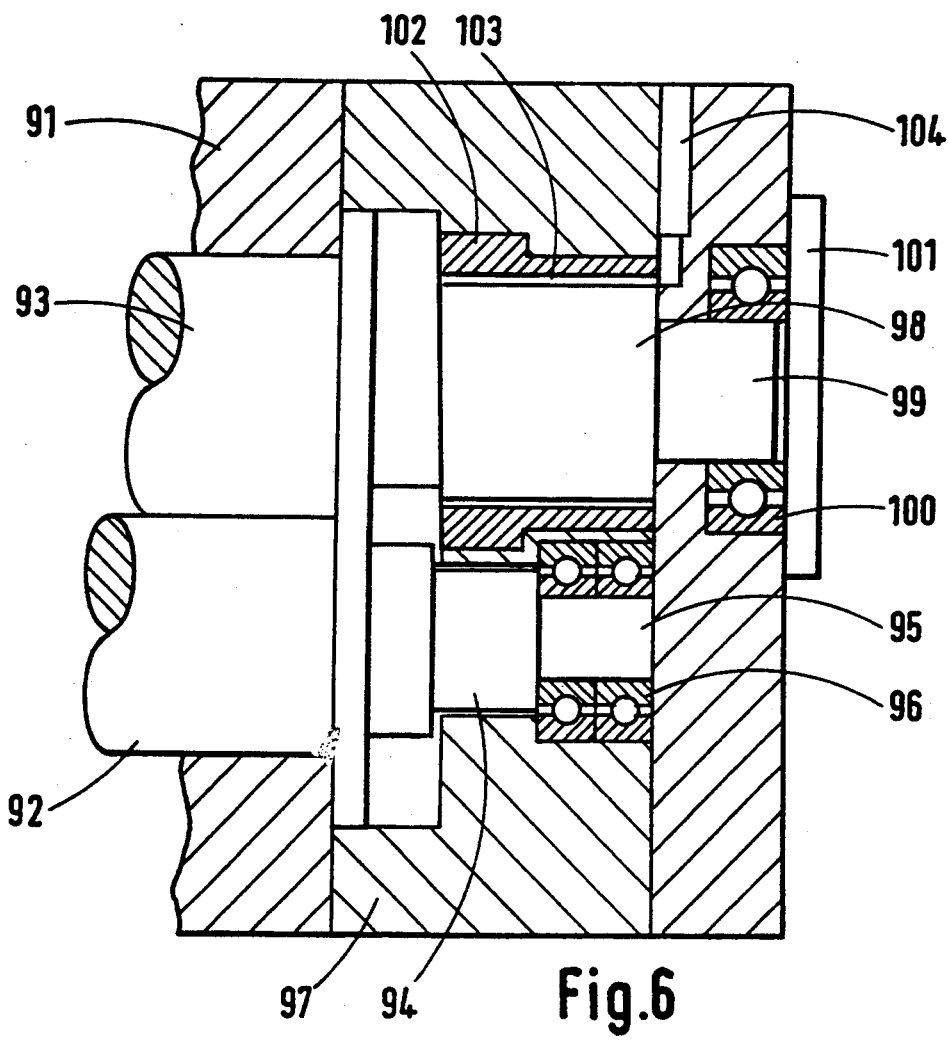
FIG. 6 is a cross-section of shear cell fitted at the end of a screw extruder with unbalanced screws.

Referring to FIG. 6, this shows a shear cell which is designed to be fitted to the end of an unbalanced screw extruder and which enables such a conventional extruder to be adapted to function in accordance with this invention. The conventional extruder may, for example, be of the kind of twin screw cooker extruder manufactured by Clextral SA of Firminy, France. The screw processor shown in this Figure includes a barrel housing (91) which contains engaging co-rotating screws (not shown) or shafts (92,93).

The tail of one shaft (92) is provided with a shaft extension portion (94) which terminates in axle (95). Axle (95) runs in bearing (96) which is fixed relative to the barrel enclosure (91) by housing extension (97).

The tail of shaft (93) is provided with a shaft extension (98) and terminates in an axle (99) running in bearing (100). Bearing (100) is fixed relative to the barrel housing (91) by end plate (101) which is fixed to the barrel housing. Shaft extension (98) runs in sleeve (102). An annular gap (103) is provided between shaft extension (98) and sleeve (102). Either or both the shaft extension (98) and sleeve (102) are removable. For example, shaft extension (98) may be splined or keyed onto the shaft (93) and sleeve (102) may be bolted to housing (91). A suitable selection of the size of the annular gap between the shaft extension (98) and the sleeve (102) of the shear generating force developed may be varied.

A suitable gap for this particular application may readily be determined by routine experiment. By way of example, annular gaps of the order of 0.5 to 5 mm, preferably 0.75 to 2 mm, can give good results for formulations based on wheat flour.

During the operation of the screws by rotating shafts (92 & 93), processed material fed to the inlets is carried by the screws to the entry to gap (103). The system pressure generated by the rotating screws forces the material into the gap (103) between the shaft extension (98) and sleeve (102). Shear forces are generated by the relative movement of the sleeve (102) and the shaft extension (98). Such forces can damage the starch cells. The amount of damage can be readily controlled by varying the annular gap. If only minor cell damage is desired, a relatively large annular gap is employed, Conversely, if major cell disruption is required, a small gap will be employed. A tortuous path can be provided by using profiled sleeves and shaft extensions as shown in FIGS. 5 or 5a. The system pressure urges the processed material through the annular gap and it leaves the shear cell, for example, through exit hole (104) for further treatment such as cooking, cooling or drying. Partial or complete cooking, however, may in fact be effected by heating the barrel of the apparatus. The length of the barrel was about 300 mm while the length of the annular gap was about 55 to 60 mm. Shear cells having gaps of 1 and 2 mm in width were tested and a low degree of starch degradation was noted.

One embodiment of the apparatus shown in FIG. 6 was tested both before and after modification by fitting the shear cell. In the unmodified apparatus, a standard diehead was bolted to the end of the housing (1) and a die fitted having the same diameter as hole (104) in the shear cell structure shown in FIG. 6.

A wheat flour paste containing 70% of wheat flour and water was processed in both extruders. In the case of the standard extruder, about 98% of the starch grains were found to be fragmented or disrupted. In contrast, using the shear cell shown in FIG. 6, only about 5% starch grains in the paste were degraded even though, theoretically, the paste has been subjected to a greater degree of shearing. It is believed that the very large proportion of fragmented starch grains in the standard equipment is caused by the grinding action of the unsupported shafts against the barrel.

The use of a shear cell fitted to a screw extruder in accordance with the invention enables unpredictable grinding of the screws in the barrel to be avoided while applying the desired degree of shear to the material to be processed.

Figure 7:
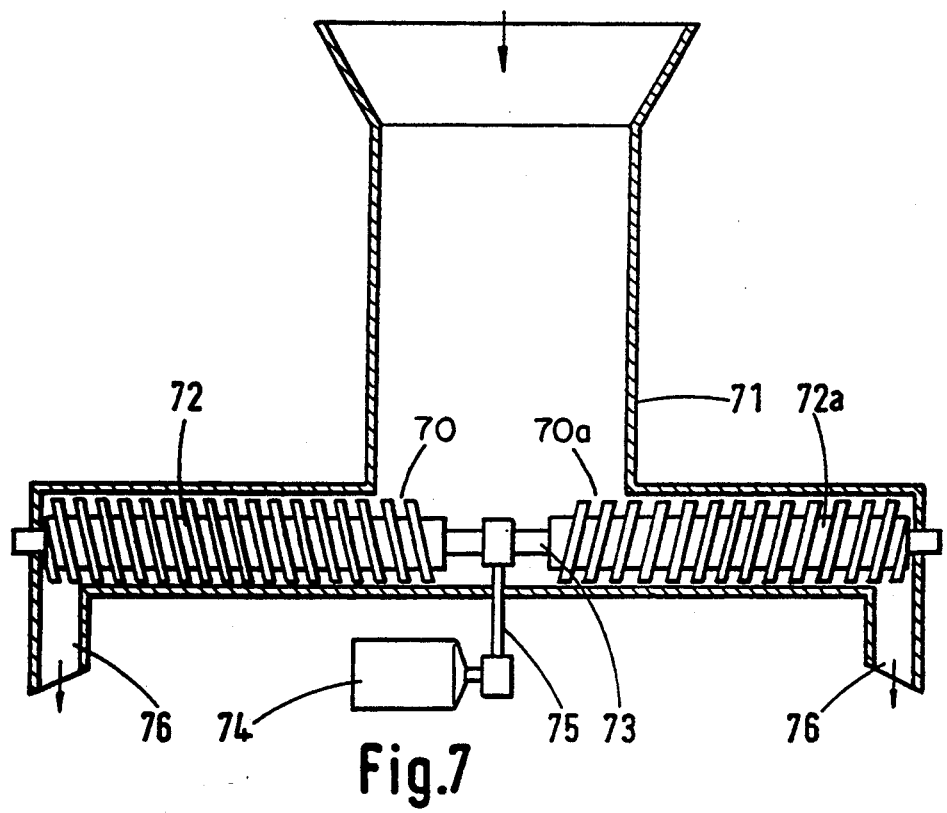
FIG. 7 shows a device for supplying material to a screw processing apparatus of the kind shown in FIGS. 1 to 4.

Accurate balancing of the thrust exerted by the screws in an extruder such as that illustrated in FIGS. 1 to 4 is influenced by the flow of material to the inlets (2). Metering of the flow rates of material from feed hoppers can be controlled in response to signals generated by thrust sensors on the bearings of the shafts. However, a feeding system may be provided which equalises the flow rate, degree of aeration and composition of the process material to each end of the barrel, A suitable feeding system is illustrated in FIG. 7. This shows a single hopper (71) from which material is taken by screw-feeding devices (70,70a) of the screws mounted on a common shaft (73). The geometry of the screws (72,72a) is identical but their sense is opposite. Since they are rotated at equal speed by motor (74) and drive (75), the flow rate of material supplied from each discharge tube (76) will also be identical. Process material can thus be fed at equal rates from tubes (76) to each end of the barrel of the processing apparatus. The feeding device shown in FIG. 7 is believed to be novel per se and may be used to control the supply of a feed stock to other processing apparatus.

Figure 8:
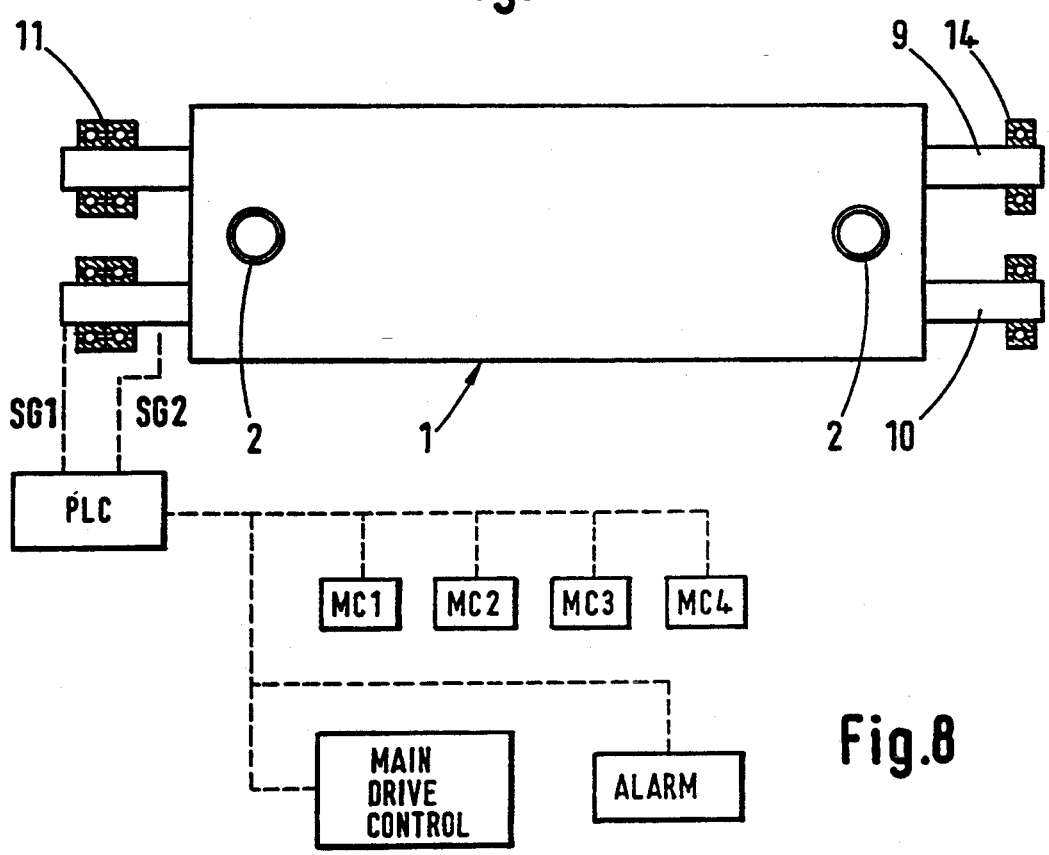
FIG. 8 is a schematic view showing an arrangement for controlling the feed device shown in FIG. 7.

Alternatively, separate feed screw devices driven by individual stepping motors or other controllable motors can be individually controlled in response to thrust sensors fitted to the bearings of the shafts (9,10) at one end of the housing of an extruder of the kind shown in FIGS. 1 to 4a. This arrangement is illustrated in FIG. 8 in which strain gauges (SG1 and SG2) sense the thrust on bearings (11).

If there is an increased mass flow of process material into feed port (2), there will be an increased thrust on bearings (11) resulting in an increased thrust on strain gauge (SG1).

The output from strain gauge (SG1) is received by programmable logic controller (PLC) and is monitored against a time base. The PLC automatically calculates the rate of change of thrust with time and compares this with a preprogram. When the comparison shows that the differential between the actual rate of thrust change and the preprogrammed rate of thrust change is increasing during a defined time interval, then a signal is sent to its associated powder feed screw motor drive control MC1 to reduce the powder feed rate in accordance with a programmed rate of reduction, previously locked into the memory of the PLC.

The reduction in flow rate of the process material to feed port (2) will decrease the thrust on bearings (11), and hence decrease the thrust on strain gauge (SG1). This leads to reduction in the differential between the recorded rate of change of thrust and the preprogrammed rate of change of thrust.

The preprogrammed rate of change of thrust is determined such that if the programmed rate of change is not exceeded, then the resulting accumulated thrust on bearings (11) would not exceed their design load.

Correspondingly, an increased mass flow rate of process material to feed port (2) would lead to an increased thrust in the other sense on bearings (11), thereby an increased thrust on strain gauge (SG2) and hence to a resulting signal from the PLC to motor drive control MC2, which controls the associated motor and powder feed screw. The powder feed screws may be as shown schematically in FIG. 7, except that the individual powder feed screws are independently driven by controllable motors. Multiple start feed screws (e.g. double or triple) are preferred since these deliver a more constant flow of material.

When processing starchy materials in cooker extruders, it is common practice to inject water near the powder feed point. In some cases, a vegetable oil or other liquids and solutions can be injected along the barrel, e.g. at 64 in FIG. 4. Previous experience indicates that the total thrust in the system can be decreased by increasing the water/powder feed ratio. With this in mind, the program should allow for additional signals to be taken to pump motor speed control units MC3 and MC4 in case this may prove suitable for some applications.

With many cereal applications, the thrust in the system can be decreased by increasing the speed of the extruder screws. The program can therefore include a further signal from the PLC which would increase screw speed if for any reason the thrust control could not be properly adjusted by changing the feed rate. Since this would represent a limiting condition, such a signal would also be accompanied by an alarm and activation of an automated shut-down procedure. It will be appreciated that the arrangement shown in FIG. 8 is useful for controlling any balanced screw extruder, whether or not fitted with a shear cell.

I claim:

1. Apparatus for processing extrudable material comprising:
   (a) a housing having opposite ends and a pair of spaced inlets for admitting material and an outlet intermediate said inlets for processed material;
   (b) a first shaft mounted for rotation within the housing and supported for rotation by bearings at its ends, said first shaft carrying first and second screws each extending from one of said inlets to the outlet, said screws having opposed threads for transporting material from the inlets to the outlet, such that forces exerted on one support bearing by the first screw acting on the material to be processed are at least partially compensated by forces exerted on the other support bearing by the second screw; and
   (c) a shear generating device located in the region of said outlet and comprising a first sleeve fixed relatively to the housing, said first shaft extending through said first sleeve and forming an annular gap with said first sleeve, and a transfer passage extending through said first sleeve and connecting the annular gap with the housing, whereby material transported by the screws towards the outlet is subjected to shearing force by passage through said annular gap.

2. Apparatus according to claim 1 wherein material exiting through the transfer passage is guided out of the housing through a diehead fitted over said outlet.

3. Apparatus according to claim 1 wherein the housing includes one or more heating elements for cooking the material during its passage through the housing.

4. Apparatus according to claim 1 which includes regulation means for separately regulating the rate of feed of the material supplied to the housing via the inlets and wherein the feed regulation means is controlled by thrust sensors in the region of the bearings supporting the shaft, whereby the thrust exerted by one screw can be maintained substantially balanced by the thrust exerted by the other screw.

5. Apparatus according to claim 1 including a second shaft parallel to said first shaft, said second shaft mounted for rotation within the housing and supported for rotation by bearings at its ends, said second shaft carrying third and fourth screws each extending from one of said inlets to the outlet, said third and fourth screws having opposed threads for transporting material from the inlets to the outlet, said shear generating device including a second sleeve fixed relatively to the housing adjacent said first sleeve, said second shaft extending through said second sleeve and forming an annular gap therewith, and an intermediate transfer passage extending through said first and second sleeves and connecting the respective annular gaps therein.

6. Apparatus according to claim 5 wherein the shafts rotate in the same direction.

* * * * *